(12) United States Patent
Stewart

(10) Patent No.: US 11,808,539 B2
(45) Date of Patent: Nov. 7, 2023

(54) METHOD FOR MANUFACTURING GUN BARRELS

(71) Applicant: Engineering Technologies & Manufacturing Ltd., Northamptonshire (GB)

(72) Inventor: James Anthony Stewart, Northamptonshire (GB)

(73) Assignee: ENGINEERING TECHNOLOGIES & MANUFACTURING LTD., Northampton (GB)

( * ) Notice: Subject to any disclaimer, the term of this patent is extended or adjusted under 35 U.S.C. 154(b) by 0 days.

(21) Appl. No.: 17/785,031

(22) PCT Filed: Dec. 8, 2020

(86) PCT No.: PCT/GB2020/053145
§ 371 (c)(1),
(2) Date: Jun. 13, 2022

(87) PCT Pub. No.: WO2021/116673
PCT Pub. Date: Jun. 17, 2021

(65) Prior Publication Data
US 2023/0036040 A1   Feb. 2, 2023

(30) Foreign Application Priority Data
Dec. 14, 2019 (GB) .................................... 1918439

(51) Int. Cl.
*F41A 21/06* (2006.01)
*B23B 41/02* (2006.01)

(52) U.S. Cl.
CPC .............. *F41A 21/06* (2013.01); *B23B 41/02* (2013.01)

(58) Field of Classification Search
CPC .......... F41A 21/06; F41A 21/08; B23C 3/002; B23C 2220/32
See application file for complete search history.

(56) References Cited

U.S. PATENT DOCUMENTS 3,159,903 A * 12/1964 Eves ....................... B23B 41/02
144/92
8,382,081 B2 * 2/2013 Van de Vosse ........ B23Q 3/061
269/9

(Continued)

FOREIGN PATENT DOCUMENTS

FR     2292530 A1   6/1976
GB        1645    *  6/1857

(Continued)

OTHER PUBLICATIONS

International Search Report dated Mar. 10, 2021 for corresponding International Application No. PCT/GB2020/053145.

(Continued)

*Primary Examiner* — Gabriel J. Klein
(74) *Attorney, Agent, or Firm* — TAROLLI, SUNDHEIM, COVELL & TUMMINO L.L.P.

(57) ABSTRACT

A method for forming a set of gun barrels, comprises: machining an elongate key along a length of a metal billet; mounting the metal billet on a machining jig, clamped along the key; performing CNC milling operations on the mounted metal billet in a 5-axis CNC milling machine to form a set of gun barrels having a pair of bores and a rib, the rib extending lengthwise proximate the elongate key; and, separating the set of gun barrels from the key along the length of the rib section. The present invention provides for significantly faster machine production with no manual handling of the workpiece throughout the milling operations. This makes the milling operations more accurate as the workpiece remains in position throughout, without reloading.

(Continued)

Holding the workpiece along a key which runs the length of what will become the rib of the barrels avoids any loading of the workpiece in areas that need to be machined. The use of a 5-axis CNC milling machine allows for variable geometries to adjust the finished shape and configuration of the gun barrels.

16 Claims, 6 Drawing Sheets

(56) References Cited

U.S. PATENT DOCUMENTS

| | | | |
|---|---|---|---|
| 9,381,621 B2* | 7/2016 | Taylor | B25B 1/103 |
| 2007/0175078 A1* | 8/2007 | Bojalad | F41A 21/06 |
| | | | 42/76.1 |
| 2010/0219573 A1* | 9/2010 | O'Rell | B25B 5/166 |
| | | | 269/287 |
| 2012/0068393 A1* | 3/2012 | Van de Vosse | B23Q 1/525 |
| | | | 29/559 |
| 2014/0072381 A1* | 3/2014 | Taylor | B25B 1/2405 |
| | | | 269/91 |
| 2015/0059565 A1* | 3/2015 | Stewart | F41A 21/08 |
| | | | 89/1.41 |

FOREIGN PATENT DOCUMENTS

| | | |
|---|---|---|
| GB | 2517724 A | 3/2015 |
| JP | 2016539309 A | 12/2016 |

OTHER PUBLICATIONS

UK Search Report dated Jun. 12, 2020 for corresponding GB Application No. 1918439.9.

* cited by examiner

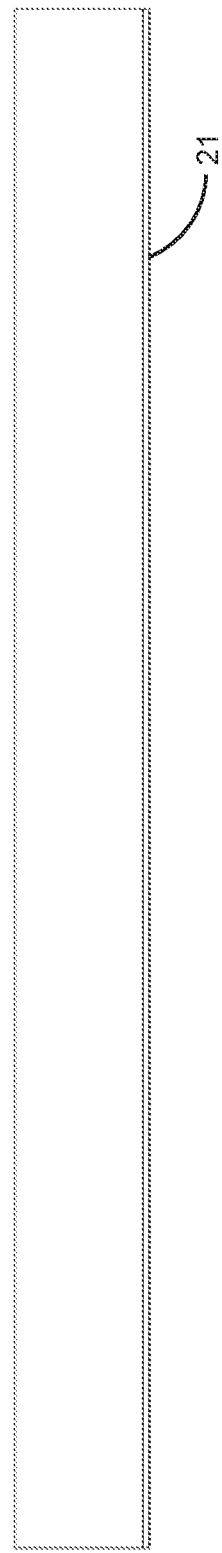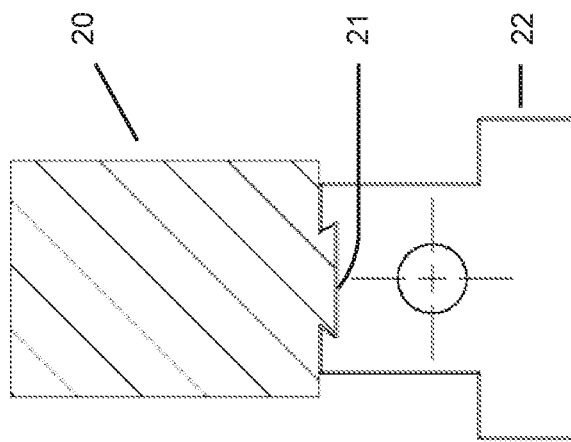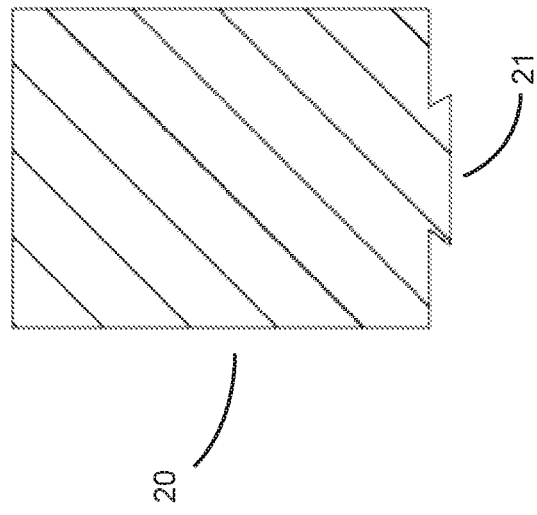

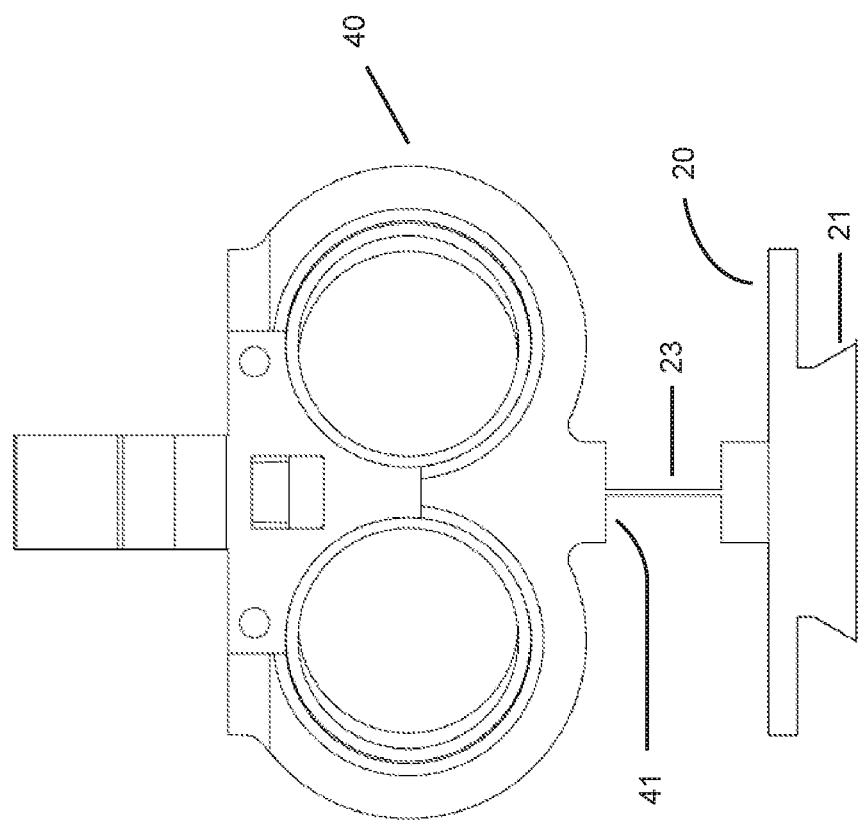

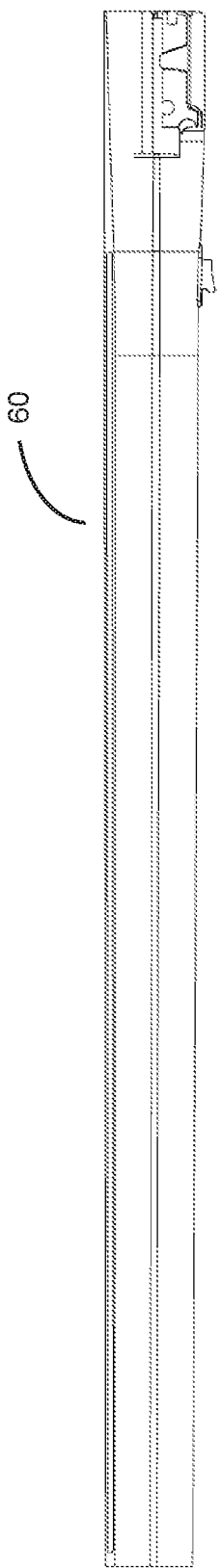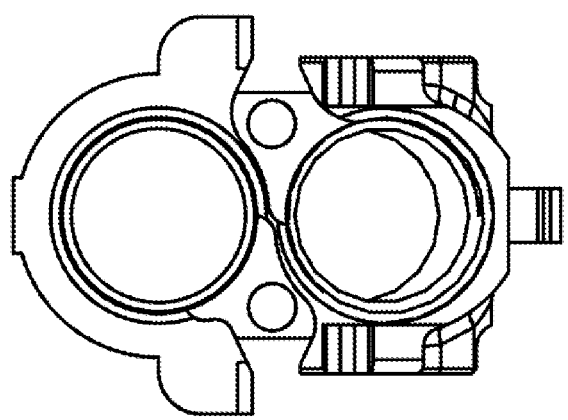
Fig. 6A
Fig. 6B

METHOD FOR MANUFACTURING GUN BARRELS

RELATED APPLICATIONS

The present application is a U.S. National Stage application under 35 USC 371 of PCT Application Serial No. PCT/GB2020/053145, filed on 8 Dec. 2020; which claims priority from GB Patent Application No. 1918439.9, filed 14 Dec. 2019, the entirety of each of which are incorporated herein by reference.

BACKGROUND TO THE INVENTION

The present invention relates to a method for manufacturing gun barrels, and particularly to a method which utilizes modern CNC milling techniques.

International patent publication WO2015028791 teaches a method for machining a set of gun barrels in which a metal billet is machined to form a barrel preform before drilling and honing a pair of bores in the barrel preform to form a finished set of gun barrels. The preferred machining operations include creep-feed grinding whilst holding the workpiece with magnets, followed by a drilling operation which requires the workpiece to be clamped at several locations along its length without causing any distortion. The machining operations are a laborious and time-consuming industrial process, requiring the workpiece to be loaded and unloaded several times, with each movement carrying a risk of subsequent misalignment of the workpiece. The entire machining process typically requires around 18 hours.

It is an object of the present invention to reduce the manufacturing time for each set of barrels whilst maintaining the accuracy of the machining process.

SUMMARY OF THE INVENTION

A method for forming a set of gun barrels, comprises: machining an elongate key along a length of a metal billet; mounting the metal billet on a machining jig, clamped along the key; performing CNC milling operations on the mounted metal billet in a 5-axis CNC milling machine to form a set of gun barrels having a pair of bores and a rib, the rib extending lengthwise proximate the elongate key; and, separating the set of gun barrels from the key along the length of the rib section:

Preferably, the gun barrels are machined to have an over-and-under configuration. Alternatively, the gun barrels are machined to have a side-by-side configuration.

Preferably, the bores are machined to be substantially parallel. Alternatively, the bores are machined to converge towards one end of the barrels.

Preferably, the key is machined to have a dovetail section.

Preferably, the milling operations comprise the steps of forming a solid barrel preform having a finished external profile and then drilling the bores.

Preferably, the method further comprises honing or reaming the bores to a predetermined internal profile.

Although in preferred embodiments for traditional shotguns and twin bore rifles only two bores are machined, it is possible to machine three or more bores.

Preferred embodiments of the present invention provide for significantly faster machine production with no manual handling of the workpiece throughout the milling operations. This makes the milling operations more accurate as the workpiece remains in position throughout, without reloading. Holding the workpiece along a key which runs the length of what will become the rib of the barrels avoids any loading of the workpiece in areas that need to be machined. The use of a 5-axis CNC milling machine allows for variable geometries to adjust the finished shape and configuration of the gun barrels.

BRIEF DESCRIPTION OF THE DRAWINGS

An example of a method for manufacturing gun barrels in accordance with the present invention will now be described in detail with reference to the accompanying drawings, in which:

FIGS. 2A and 2B show a metal billet which has been machined to form an elongate key along one side;

FIG. 3 shows a cross section of the metal billet of FIG. 1 clamped in a milling jig prior to milling operations;

FIG. 4 shows a cross section of a finished pair of side-by-side gun barrels prior to separation;

DETAILED DESCRIPTION

Figure 1:
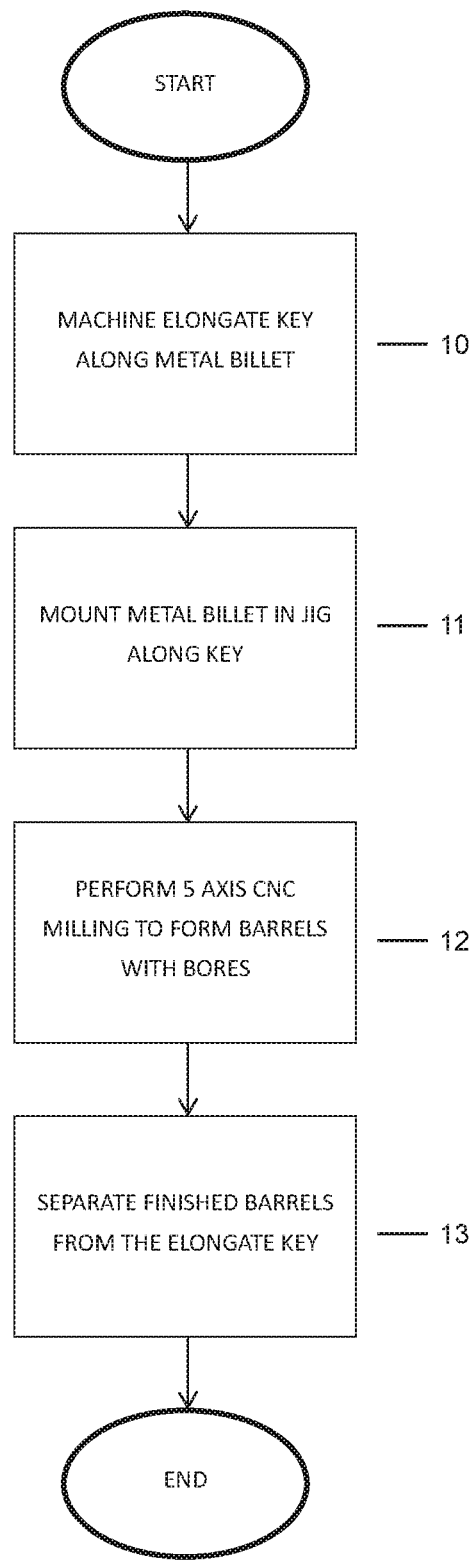
FIG. 1 is flow diagram showing the principal steps in the manufacturing process.
Figure 5A:
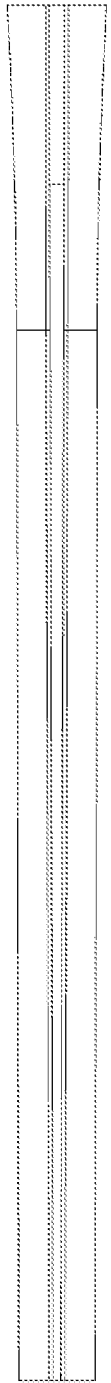
FIGS. 5A to 5D show a finished set of side-by-side gun barrels manufactured by the method of the present invention; and, FIGS. 6A and 6B show a finished set of over-and under gun barrels manufactured by the method of the present invention.
Figure 5B:
Figure 5C:
Figure 5D:
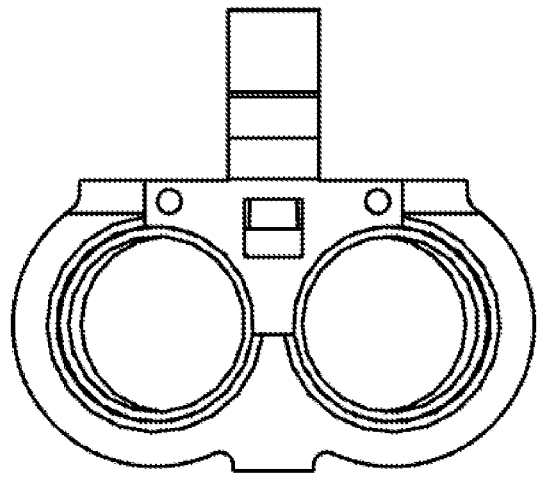

FIG. 1 is a flow diagram which illustrates some of the machining operations used to manufacture a set of gun barrels in accordance with one example of the present invention.

The starting material for the manufacturing process is a solid billet of metal. The metal billet may have a mass of between 10 kg and 30 kg, but typically between 20 kg and 27 kg, depending on the gauge of the barrels. The dimensions of the metal billet must be such that the metal billet is large enough for at least the barrels to be machined from the metal billet. Preferably, the metal billet is large enough so that the entire barrel set, including any rib, fore end loop or any other attachments to the barrels is also be machinable from the same metal billet.

In a preferred embodiment, the metal billet is an ordinance quality Cr—Mo steel alloy. Ordinance quality steel of this type is a high-alloy steel having around 0.4% wt carbon, 1% wt manganese, 0.25% wt molybdenum, 1% wt chromium and trace amounts of phosphorous and sulphur. The steel is supplied in a hardened and tempered condition so that no further heat treatment is required. Such steel offers good machinability and uniform hardness. Preferably, the hardness of the metal billet is at least 245 HB, more preferably between 285 and 340 HB.

In a preliminary step 10, the metal billet is machined to form an elongate key along its length. The preferred profile for the elongate key is a dovetail section which provides enhanced mechanically stability when mounted in a CNC machining jig, without ever applying mechanical forces to the workpiece which might create distortions during milling operations. For over-and-under barrels the elongate key is machined along one face of the metal billet adjacent to where the rib for the barrels will be formed above what will become the top barrel. For side-by-side barrels, the elongate key is machined along one face of the metal billet adjacent to where the central rib between the left and right barrels will he formed.

FIGS. 2A and 2B show an example of a metal billet 20 which has been machined to form an elongate key 21 along one side 22, where the key has a dovetail section.

Referring again to FIG. 1, in the next step 11, the elongate dovetail key 21 of the metal billet 20 is mounted within a complementary shaped keyway in an elongate CNC milling jig 22. This is shown in FIG. 3, with the elongate dovetail key 21 clamped within the milling jig 22 prior to CNC milling operations.

In step 12, the CNC milling jig 22 is mounted within a 5-axis CNC milling machine. Such a machine is able to perform multiple milling operations using interchangeable cutting tools, The term "5-axis" refers to the number of directions in which the cutting tool can move. On a 5-axis machine, the cutting tool moves across the X, Y and Z linear axes as well as rotates on the A and B axes to approach the workpiece from any direction. This allows the milling operations to be completed without having to handle or adjust the position of the workpiece.

In the preferred embodiment, the milling operations in step 12 first machine the external surface of the metal billet to form a substantially finished set of barrels but with a solid cross-section. The bores are then machined, preferably by drilling, and optionally by honing or reaming, to complete the set of gun barrels. The bores can be machined to be substantially parallel or instead to converge to some extent along their length towards the distal end of the barrels.

As shown in FIG. 4 for a set of side-by-side barrels 40, the finished barrels 40 remain attached to the remainder of the original metal billet 20 along a thin web of metal 23 running along the length of the metal billet adjacent the top db 41.

In step 13, the finished set of gun barrels are separated from the elongate dovetail key 20 along a thin web of metal 23 defining a line of weakness which runs along the billet lust adjacent to the top rib 41 of the gun barrels 40. Final finishing steps to remove any excess material along the top rib 41 can then be performed. Various views of the separated set of gun barrels are shown in FIGS. 5A to 5E.

FIGS. 6A and 66 show a finished set of gun barrels for an over-and-under shotgun 60.

Preferably, a hot blacking process is performed on the finished set of barrels. This is more resilient than a cold blacking process. Known techniques typically perform a cold blacking process and hot blacking is avoided due to the resulting seepage of chemicals into soldered ribs, which causes rusting. Since the barrels according to embodiments are not attached by soldered ribs, no such problems are caused by the hot blacking process. A hot blacking process does not affect the mechanical properties of the metal to the extent that the straightness of the barrels is compromised. Finishing operations also include polishing the barrels and any other operations as would be known to a person skilled in the art, The finished barrels typically have a mass of about 1.3 kg.

The manufacturing process described above typically reduces the manu uring time down to around 8 hours, with a reduction in wastage through machining inaccuracies.

The invention claimed is:

1. A method for forming a set of gun barrels, comprising:
   machining an elongate key along a length of a metal billet;
   mounting the metal billet on a machining jig, clamped along the key;
   performing CNC milling operations on the mounted metal billet in a 5-axis CNC milling machine to form a set of gun barrels having a pair of bores, a rib, and a web connecting the elongate key to the rib, the rib extending lengthwise proximate the elongate key; and,
   separating the set of gun barrels from the key along the length of the rib section.

2. A method according to claim 1, in which the gun barrels are machined to have an over-and-under configuration.

3. A method according to claim 1, in which the gun barrels are machined to have a side-by-side configuration.

4. A method according to claim 1, in which the bores are machined to be substantially parallel.

5. A method according to claim 1, in which the bores are machined to converge towards one end.

6. A method according to claim 1, in which the elongate key has a dovetail section.

7. A method according to claim 1, in which the milling operations comprise the steps of forming a solid barrel preform having a finished external profile and then drilling the bores.

8. A method according to claim 1, further comprising honing or reaming the bores to a predetermined internal profile.

9. A method according to claim 1, in which three or more bores are machined.

10. A method according to claim 1, wherein separating the gun barrels from the key includes the steps of:
    severing the web between the rib and elongate key, and
    performing finishing steps to remove any excess material remaining from the key along the rib.

11. A method according to claim 1, wherein the step of performing CNC milling operations on the mounted metal billet includes avoiding application of mechanical loading forces to the metal billet which create distortions in the set of gun barrels.

12. A method according to claim 1, wherein the mounted metal billet remains in position throughout the CNC milling operations.

13. A method for forming a set of gun barrels, comprising:
    machining an elongate key along a length of a metal billet;
    mounting the metal billet on a machining jig, clamped along the key;
    performing CNC milling operations on the mounted metal billet in a 5-axis CNC milling machine to form a set of gun barrels having a pair of bores, and a rib, and a web connecting the elongate key to the rib, the rib extending lengthwise proximate the elongate key, without applying mechanical loading forces to the metal billet which create distortions in the set of gun barrels; and,
    separating the set of gun barrels from the key along the length of the rib section,
    wherein the mounted metal billet remains in position throughout the CNC milling operations.

14. A method according to claim 13, in which the bores are machined to be substantially parallel.

15. A method according to claim 13, in which the milling operations comprise the steps of forming a solid barrel preform having a finished external profile and then drilling the bores.

16. A method for forming a set of gun barrels, comprising:
    machining an elongate key along a length of a metal billet;
    mounting the metal billet on a machining jig, clamped along the key;
    performing CNC milling operations on the mounted metal billet in a 5-axis CNC milling machine to form a set of gun barrels having a pair of bores and a rib, with the rib being attached along its length to the elongate key via a metal web; and,
    separating the set of gun barrels from the key along the length of the metal web, wherein the metal billet is maintained in a single predetermined position throughout the CNC milling operations to form the set of gun barrels having the pair of bores and the rib.

* * * * *